No. 757,328. Patented April 12, 1904.

UNITED STATES PATENT OFFICE.

MITFORD C. MASSIE, OF WASHINGTON, DISTRICT OF COLUMBIA, ADMINISTRATOR OF FRITZ ACH, DECEASED, ASSIGNOR TO C. F. BOEHRINGER & SOEHNE, OF MANNHEIM-WALDHOF, GERMANY, A FIRM.

ART OF PREPARING XANTHIN DERIVATIVES.

SPECIFICATION forming part of Letters Patent No. 757,328, dated April 12, 1904.

Application filed February 7, 1903. Serial No. 142,589. (Specimens.)

*To all whom it may concern:*

Be it known that FRITZ ACH, deceased, late a citizen of Germany, and a resident of Mannheim, Germany, did invent new and useful Improvements in the Art of Preparing Xanthin Derivatives; and I, MITFORD C. MASSIE, the duly-constituted administrator of the estate of said FRITZ ACH, deceased, do hereby declare the following to be a full, clear, and exact description of the said invention of said decedent, such as will enable others skilled in the art to which it appertains to make and use the same.

The present invention relates to the art of preparing derivatives of alkylized xanthins, or, more specifically, the manufacture of haloid substitution products of alkylized xanthins or of xanthin homologues.

The object of this invention is to obtain a new series of compounds which may be employed for the production of pharmacal preparations or bodies.

In United States Patent No. 667,381, dated February 5, 1901, and German Patent No. 128,212, issued February 8, 1902, there have been described a number of homologues of xanthin in which a methyl group is bound to the carbon atom occupying the position 8. It was found in the course of the inventor's experiments with these bodies that the hydrogen atoms of this methyl group may be readily replaced by a haloid element, particularly chlorin. It was found in this connection that according as the proportions of the reagents are chosen so that one, two, or three molecules of chlorin are caused to act on a molecule of an 8-methyl-xanthin, mono, di, or tri chloro substitution products, respectively, of the named 8-methyl xanthins are obtained. Thus, for example, an 1-3-7-trimethyl-8-monochloro-methyl-xanthin, having the structural formula:

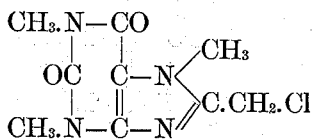

may be obtained from 1-3-7-8-tetramethyl-xanthin or 8-methyl-caffein by causing a molecule of chlorin to act on a molecule of this body. If two molecules of chlorin are caused to act on one molecule of 8-methyl-caffein, two of the hydrogen atoms of the 8-methyl group are replaced, giving rise to 1-3-7-8-trymethyl-8-dichloromethyl-xanthin or 8-dichloromethyl-caffein, and, finally, if the proportions of the chlorin to the said starting compound are as three to one, a compound, which are designated as 8-trichloromethyl-caffein, having the formula:

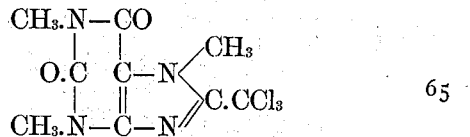

results. The reaction proceeds in a similar manner, resulting in a chloro substitution product if chlorin is caused to react on 3-7-8-trimethyl-xanthin or 8-methyltheobromin and in general on the alkylized xanthins above defined.

This invention may be carried out in the simplest manner by causing chlorin gas in the properly-calculated amounts to act upon an 8-methyl-xanthin derivative (under which term are of course included the salts, such as the chlorids of these bodies) in solution or suspension. It is to be understood, however, that other chloridizing agents—such, for example, as sulfurylchlorid or sulfuric oxychlorid ($SO_2Cl_2$)—may be successfully employed and are included within the scope of the invention and claims.

The new compounds obtained under this invention are well-defined tolerably-stable bodies, differing from the starting compounds in possessing no basic properties, and the trichloro-methyl-xanthins comprised among them are obtained as colorless crystalline solids, which melt at higher temperatures, are not volatile at ordinary atmospheric pressure, and are soluble in hot chloroform. They are all to be used in the arts as starting materials tin he manufacture of pharmacal products.

A number of examples embodying what is considered the preferred manner of carrying the invention into effect will now be recited in detail.

*Example 1—Preparation of 8-Monochloromethyl-caffein.*

Fifty grams of dry 8-methyl-caffein are dissolved in two hundred and fifty cubic centimeters of chloroform free from water. This solution is kept cool with ice and is saturated with dry hydrochloric-acid gas. As a result of this treatment the chlorid of the base, 8-monochloromethyl-caffein, is thrown out. To the resultant crystalline mushy mass another two hundred and fifty cubic centimeters of chloroform free from water are added, and the whole is then heated to boiling in a reflux apparatus and maintained at this temperature, chlorin gas being concurrently introduced. After about eighteen grams of chlorin, corresponding to about one molecule, have been consumed solution will have taken place. The reaction proceeds according to the equation:

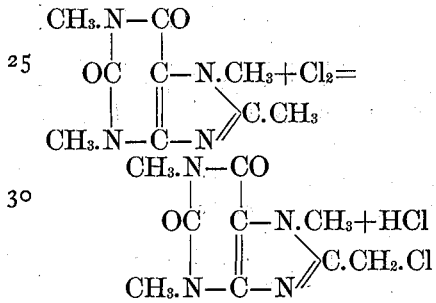

The chloroform is then recovered from the solution by distilling off, which leaves a thick syrupy residue, which on cooling solidifies into a crystalline mass. The chloro compound thus obtained is purified by redissolving in alcohol or, preferably, in acetic ether, from which solution it crystallizes in the form of snow-white coarse needles.

By analysis the formula of the new compound is found to be:

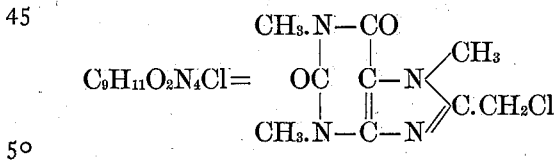

This new compound melts between 208° and 210° centigrade. It is readily soluble in hot chloroform and in hot acetic ether, but not so readily soluble in boiling alcohol.

*Example 2—Preparation of 8-Dichloromethyl-caffein.*

Two hundred grams of dry 8-methyl-caffein are dissolved in five hundred cubic centimeters of chloroform free from water, and into this solution at ordinary room temperature one hundred and forty grams of chlorin, corresponding to about two molecules, are introduced while constantly stirring or agitating the solution, a small increase of temperature occurring during this treatment. The chloroform is thereupon recovered to the fullest extent possible by distilling off, and the crystalline residue is finely comminuted or powdered and boiled with about five times its weight of acetic ether in a reflux apparatus. As a result of this treatment almost pure 8-dichloromethyl-caffein is left as a residue, the mono-chloro compound which was mixed with it as an impurity having been dissolved out by the acetic ether. The reaction proceeds according to the equation:

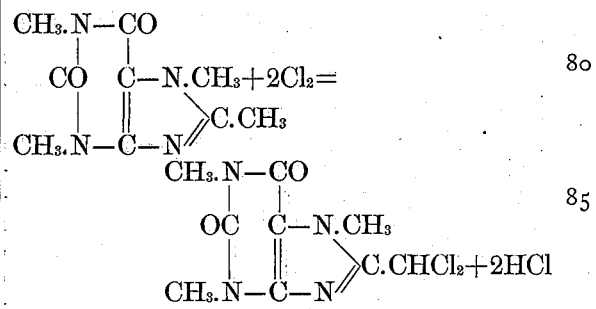

8-dichloromethyl-caffein is readily soluble in chloroform, but more difficultly soluble in alcohol, from which it crystallizes in colorless needles, having a melting-point at about 230° to 232° centigrade. According to analysis its formula is:

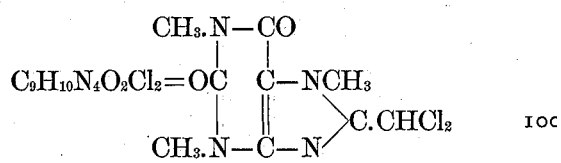

*Example 3—Preparation of 8-Trichloromethyl-caffein.*

(a) *By means of chlorin gas.*—Fifty-five grams of chlorin gas, corresponding to about three molecules, are introduced at a temperature of about 20° centigrade into a solution of fifty grams of dry 8-methyl-caffein in two hundred and fifty cubic centimeters of chloroform free from water, the said solution being constantly stirred during the introduction of the gas. The solution is then evaporated to dryness, whereby the trichloro compound is left as a residue. The reaction proceeds according to the equation:

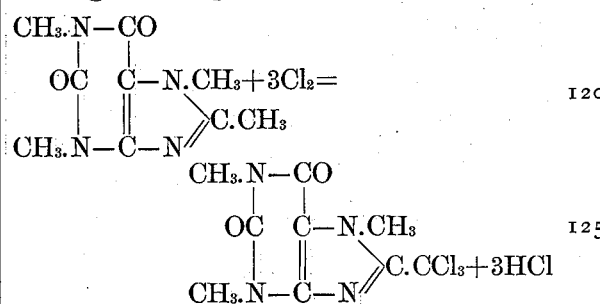

The residue is then purified by dissolving in acetic ether and crystallizing therefrom. The new compound is obtained in white needles, having a melting-point of about 182° to 184° centigrade. Its formula is ascertained to be:

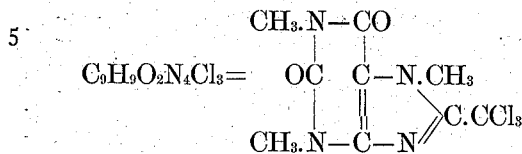

This compound is not volatile at ordinary pressures and is soluble in hot chloroform.

(b) *By means of sulfuryl-chlorid.*—Two hundred and seventy grams of sulfuryl-chlorid are poured or otherwise gradually introduced into a solution of one hundred grams of 8-methyl-caffein in five hundred cubic centimeters of chloroform, which solution is kept cool with ice and which is also constantly kept in motion while the sulfuryl-chlorid is introduced. After all of the sulfuryl-chlorid has been run in and the evolution of hydrochloric acid has ceased the chloroform is distilled off. The residual crude product, the 8-trichloromethyl-caffein, is purified in the manner described above. The reaction by which the new body is formed is expressed by the equation:

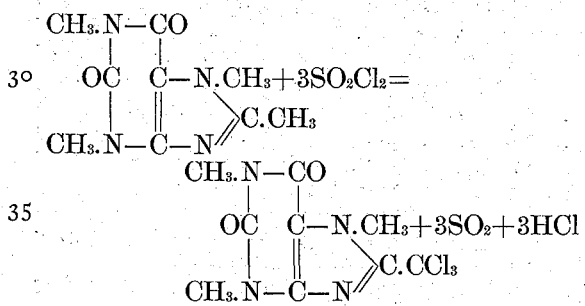

*Example 4—Preparation of 8-Trichloromethyl-theobromin.*

One hundred grams of 8-methyl-theobromin are suspended in two thousand cubic centimeters of phosphorus oxychlorid in which are dissolved one hundred and thirty grams of chlorin. This mixture is then constantly shaken or agitated for four hours at ordinary temperature. The chlorin is thereby caused to gradually disappear by combining with the theobromin derivative, and the greater portion of the suspended matter gradually goes into solution. The whole is thereupon placed on the filter to separate the small amount of unchanged methyl-theobromin, and the filtrate is thereupon subjected to evaporation *in vacuo* sufficient to drive off the phosphorus oxychlorid and to leave the new resultant body, the 8-trichloro methyl-theobromin, or 3-7-dimethyl-8-trichloro methyl-xanthin, as a residue, which is purified by dissolving in acetic ether and crystallizing therefrom. The crystals thus obtained are in the form of shining prisms, which contain acetic ether of crystallization, said acetic ether being, however, readily and gradually dissipated when drying the crystals in the air. This new xanthin derivative melts at about 211° to 212° centigrade.

The formation of the new body is indicated in the equation:

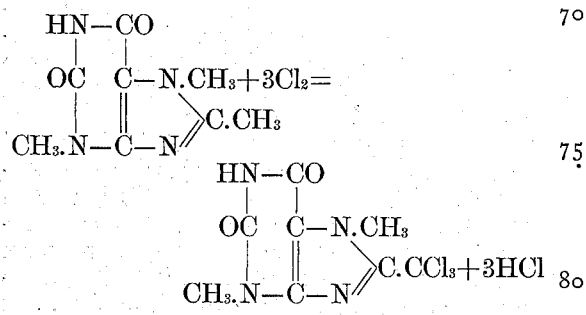

This new compound is also distinguished by its non-basic properties by not being volatile at ordinary pressures and being soluble in hot chloroform and by the fact that it forms in colorless crystals.

*Example 5—Preparation of 8-Trichloromethyl-7-monochloromethyl-1-3-di-methylxanthin or Tetra-chloromethyl-caffein.*

By proceeding in the manner thus far described one is enabled to obtain mono, di, and tri chloro substitution products of 8-alkyl-xanthins. The invention is broader than this, however, since it is possible under the same to prepare tetra-chloro substitution products by substituting a Cl atom for one of the hydrogen atoms in a methyl group bound to one of the nitrogens in the 8-alkyl-xanthin. This is effected by submitting the alkyl-xanthin in question to a vigorous chlorinizing action. Thus, for example, the inventor has succeeded in preparing tetra-chloromethyl-caffein or 8-trichloromethyl-7-mono-chloromethyl-1,3-dimethyl-xanthin having the structural formula:

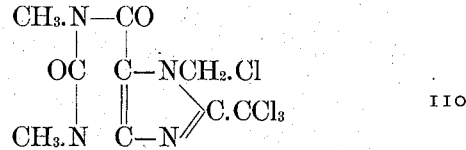

by the following preferred method: A solution of one part, by weight, of 8-methyl-caffein in about eight parts, by weight, of nitrobenzol is heated on a water-bath, and into the so-heated solution a large excess of chlorin gas is introduced until no more of the same is absorbed. Thereupon the uncombined chlorin which remains dissolved in the nitro-benzol is expelled as far as possible by introducing into or passing over the liquid a current of air, whereupon the greater portion of the nitrobenzol is distilled off from the whole in a vacuum. The residue is then allowed to cool, whereupon the new compound, the 8-trichloromethyl-7-chloromethyl-1, 3-dimethyl-xanthin, is thrown out in the form of coarse crystals which are in a fairly-pure condition without further treatment. For more complete purification they are redissolved in hot alcohol, from which they separate in the form of large colorless prismatic crystals which melt at about 204° to 205° centigrade. The new compound is soluble in chloroform, difficultly soluble in alcohol and acetic ether. This new compound is to serve as a starting material for the manufacture of pharmacal compounds and preparations.

From the above examples it will be noted that the chlorinizing reagent acts on the 8-alkyl-xanthins recited either in solution or in suspension, both of which conditions are herein designated by the comprehensive term "bath of 8-alkyl-xanthin" or "bath of 8-methyl-xanthin" in the generic claims. It will also be observed that the resultant compound may have the alkyl group in the position 8 chlorinized by replacing two or three of the hydrogen atoms in said alkyl group.

What is claimed, and desired to be secured by Letters Patent, is—

1. In the art of preparing xanthin derivatives, the process which consists in acting upon an 8-alkyl-xanthin with an agent which will give up a haloid element.

2. In the art of preparing xanthin derivatives, the process which consists in acting on an 8-alkyl-xanthin with a chlorinizing agent.

3. In the art of preparing xanthin derivatives, the process which consists in acting upon an 8-methyl-xanthin with a chlorinizing agent.

4. In the art of preparing xanthin derivatives, the process which consists in causing a chlorinizing agent to act on a bath of an 8-alkyl-xanthin.

5. In the art of preparing xanthin derivatives, the process which consists in causing a chlorinizing reagent to act on a solution of an 8-alkyl-xanthin.

6. In the art of preparing xanthin derivatives, the process which consists in causing a chlorinizing reagent to act on a bath of an 8-alkyl-xanthin, the relative proportions being molecular according to the number of chlorin atoms to be bound in the resultant compound.

7. In the art of preparing xanthin derivatives, the process which consists in causing a chlorinizing reagent to act on a solution of 8-alkyl-xanthin, the relative proportions being molecular according to the number of chlorin atoms to be bound in the resultant compound.

8. In the art of preparing xanthin derivatives, the process which consists in causing a chlorinizing agent to act on a bath of an 8-methyl-xanthin.

9. In the art of preparing xanthin derivatives, the process which consists in causing a chlorinizing reagent to act on a solution of an 8-methyl-xanthin.

10. In the art of preparing xanthin derivatives, the process which consists in causing a chlorinizing reagent to act on a bath of an 8-methyl-xanthin, the relative proportions being molecular according to the number of chlorin atoms to be bound in the resultant compound.

11. In the art of preparing xanthin derivatives, the process which consists in causing a chlorinizing reagent to act on a solution of 8-methyl-xanthin, the relative proportions being molecular according to the number of chlorin atoms to be bound in the resultant compound.

12. In the art of preparing xanthin derivatives, the process which consists in causing chlorin to act on a bath of an 8-methyl-xanthin.

13. In the art of preparing xanthin derivatives, the process which consists in causing chlorin to act on a solution of an 8-methyl-xanthin.

14. In the art of preparing xanthin derivatives, the process which consists in causing chlorin to act on a bath of an 8-methyl-xanthin, the relative proportions being molecular according to the number of chlorin-atoms to be bound in the resultant compound.

15. In the art of preparing xanthin derivatives, the process which consists in causing chlorin to act on a solution of an 8-methyl-xanthin, the relative proportions being molecular according to the number of chlorin atoms to be bound in the resultant compound.

16. The process which consists in acting upon a bath of an 8-alkyl-xanthin in chloroform with a chlorinizing reagent.

17. The process which consists in acting on a solution of an 8-methyl-xanthin in chloroform with a chlorinizing reagent.

18. The process which consists in acting upon a bath of an 8-alkyl-xanthin in chloroform with chlorin.

19. The process which consists in acting on a solution of an 8-methyl-xanthin in chloroform with chlorin.

20. The process which consists in acting on a bath of an 8-alkyl-xanthin in chloroform with a chlorinizing reagent and then, after the reaction is complete, driving off the chloroform and evaporating to dryness.

21. The process which consists in acting on a bath of an alkylized 8-alkyl-xanthin in chloroform with a chlorinizing reagent, then after the reaction is complete, driving off the chloroform and evaporating to dryness.

22. The process which consists in acting on a bath of an 8-methyl-caffein in chloroform with a chlorinizing reagent, then after the reaction is complete, driving off the chloroform and evaporating to dryness.

23. The process which consists in acting on a bath of an 8-methyl-caffein in chloroform with a chlorinizing reagent, then after the reaction is complete, driving off the chloroform and evaporating to dryness, then redissolving in acetic ether and crystallizing therefrom.

24. The process which consists in acting on a bath of an 8-alkyl-xanthin in chloroform with chlorin, then after the reaction is complete, driving off the chloroform and evaporating to dryness.

25. The process which consists in acting on a bath of an alkylized 8-alkyl-xanthin in chloroform with chlorin, then after the reaction is complete, driving off the chloroform and evaporating to dryness.

26. The process which consists in acting on a bath of an 8-methyl-caffein in chloroform with chlorin, then after the reaction is complete, driving off the chloroform and evaporating to dryness.

27. The process which consists in acting on a bath of an 8-methyl-caffein in chloroform with chlorin, then after the reaction is complete, driving off the chloroform and evaporating to dryness, then redissolving in acetic ether and crystallizing therefrom.

28. As a new chemical compound, an 8-chloro-alkyl-xanthin which is distinguished by having the alkyl group in the position 8 chlorinized, and which has substantially no basic properties.

29. As a new chemical compound, an 8-trichloro-alkyl-xanthin which is distinguished by having the three of the hydrogen atoms in the position 8 replaced by chlorin, and which has substantially no basic properties.

30. As a new chemical compound, an 8-trichloro-methyl-xanthin having the three hydrogen atoms of the methyl group in the position 8 replaced by chlorin, which has substantially no basic properties, and which is distinguished by forming in colorless crystals which melt at a high temperature, which are not soluble in hot chloroform.

31. As a new chemical compound, 8 trichloro-alkyl-caffein, being derived from 8-alkyl-caffein by the substitution of chlorin for three hydrogen atoms in the alkyl group at the position 8, and which has substantially no basic properties.

32. As a new chemical compound, 8-trichloro-methyl-caffein having the formula hereinbefore given, which has substantially no basic properties, which is soluble in acetic ether and hot chloroform and crystallizes therefrom in white needles having a melting-point of about 182° to 184° centigrade and being stable or non-volatile at ordinary pressures.

In testimony whereof I affix my signature in presence of two witnesses.

MITFORD C. MASSIE,
*Administrator of the estate of Fritz Ach, deceased.*

Witnesses:
ALBANUS S. T. JOHNSON,
L. E. A. O'KEEFFE.